March 1, 1955    J. S. BAKER    2,703,107
PRESSURE ACTUATED CONTROL DEVICE
Filed June 27, 1950    2 Sheets-Sheet 1
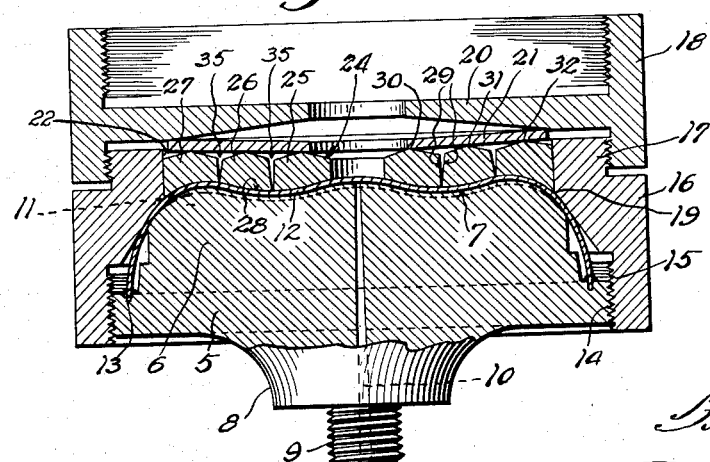
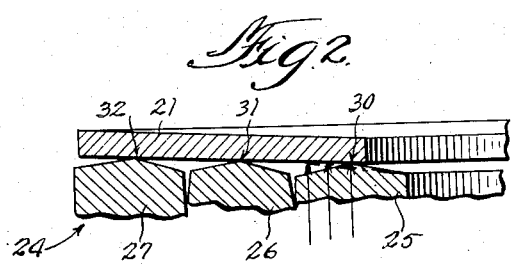
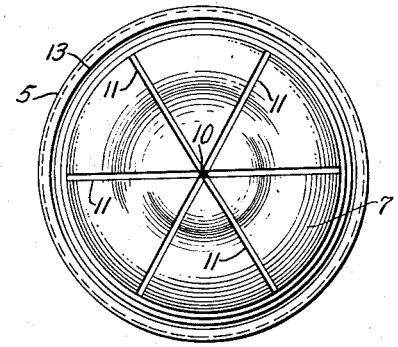
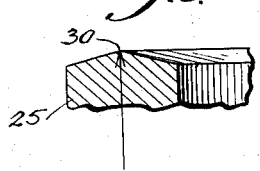
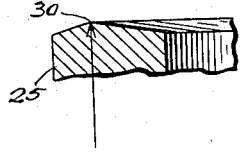
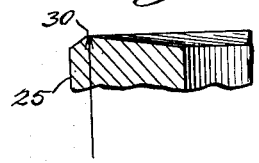
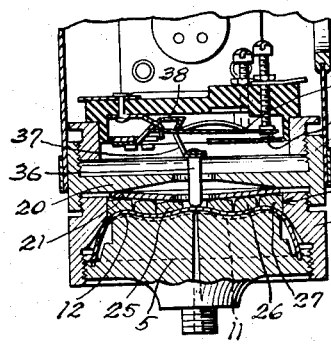
INVENTOR.
John S. Baker
BY
Thiess, Olson & Mecklenburger March 1, 1955   J. S. BAKER   2,703,107
PRESSURE ACTUATED CONTROL DEVICE
Filed June 27, 1950   2 Sheets-Sheet 2

INVENTOR.
John S. Baker.
BY
Thiess, Olsen & Mecklenburger
Attys.

United States Patent Office 2,703,107
Patented Mar. 1, 1955

2,703,107

PRESSURE ACTUATED CONTROL DEVICE

John S. Baker, Chicago, Ill., assignor to Cook Electric Company, Chicago, Ill., a corporation of Illinois Application June 27, 1950, Serial No. 170,578

15 Claims. (Cl. 137—788)

This invention relates to pressure actuated devices.

Most pressure actuated devices employ a pressure responsive member in the form of a flexible diaphragm. The diaphragm cooperates with actuating means and is responsive either to an increase of fluid pressure or to a decrease of fluid pressure. Unless pressure loading means is employed, the movement or travel of the diaphragm is substantial for the operating pressure and this is particularly true in case of a high operating pressure. Although many forms of loading means may be used, a Belleville spring desirably provides adequate movement to operate the parts to be actuated when sufficient pressure exists. Notwithstanding the fact that the motion of a Belleville spring is desirably large compared to the pressure change affecting its over-center action, it has been found impossible to transmit motion from a sealed diaphragm to a Belleville washer without introducing destructive stresses into the diaphragm.

As heretofore constructed, pressure actuated devices usually employ a pressure responsive member generally in the form of a flexible diaphragm. The diaphragm cooperates with actuating means and is responsive to either an increase or a decrease of fluid pressure or to a pressure actuating means. The movement of the diaphragm is generally substantial in order to produce rapid opening and closing of the member to be actuated. This movement increases as the operating pressure is increased. It is difficult therefore to use the same device for higher operating pressures because the diaphragm is required to travel too far. On the other hand, there is a difference between the pressure at which a device is operated in one direction during an increasing fluid pressure and the pressure at which the same device is operated in an opposite direction during a decreasing fluid pressure. This pressure differential is quite considerable due to the substantial travel initially of the diaphragm required in these devices, and consequently, it has been a problem to secure a small pressure differential between the opening and the closing of the switch.

An object of the invention is to provide, therefore, an improved form of pressure actuated device having pressure loading means for the diaphragm in the form of a Belleville spring and improved means of transmitting pressure between the Belleville spring and the diaphragm that will not impose destructive stresses upon the diaphragm.

A further object of the invention is to provide an improved pressure transmitting means between the diaphragm and Belleville spring that is flexible and particularly flexible in an axial direction so that the same engagement continues between these parts throughout the entire movement of the same.

A still further object of the invention is to provide an improved pressure transmitting means between the diaphragm and Belleville spring for the purposes set out above, which will provide for ready replacement or radial change of the innermost point of contact with the Belleville spring whereby the pressure range may be quickly changed to secure a higher or a lower operating pressure for the device.

Other objects and advantages of the invention will be apparent from the foregoing description when taken in connection with the accompanying drawings which form a part hereof.

In the drawings:

Figure 1 is a sectional view of that part of a pressure actuated device which embodies the invention;

Fig. 2 is an enlarged cross section of a portion of the Belleville spring and the flexible connection between the same and the diaphragm;

Figs. 3, 4 and 5 illustrate how a portion of this flexible connection may be replaced or changed to change the operating pressure range of the device;

Fig. 6 is a cross-sectional view of the pressure actuated device illustrating an electric switch incorporated therein and connected to the diaphragm for operation.

Fig. 9 is a detail view illustrating grooves in the face of the diaphragm seat.

Figure 7:
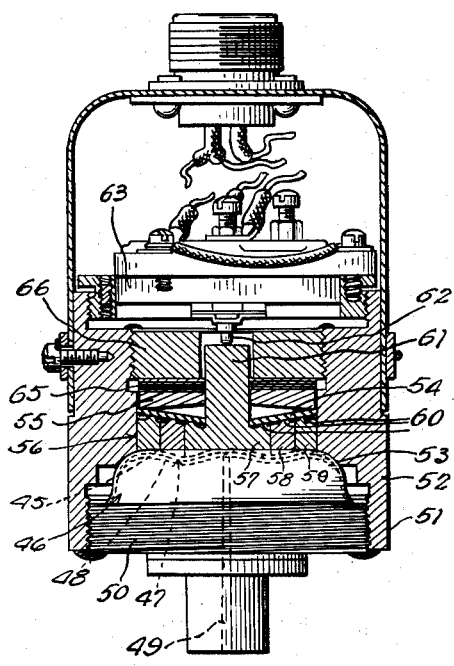
Fig. 7 is a cross-sectional view of a modified form of structure embodying the invention.

The structure illustrated in Fig. 1 comprises a base member 5 having a raised central portion 6 which is preferably formed with a diaphragm receiving surface 7. The lower part of base 5 may be provided with a depending portion 8 threaded at 9 for connection to a suitable source of fluid pressure. A central passage 10 extends upwardly through base 5 to the diaphragm receiving surface 7 and communicates with a number of cross grooves 11 cut or formed in this diaphragm receiving surface 7. A diaphragm 12 is seated upon surface 7 and has its periphery sealed at 13 to base 5, the particular sealing connection being of any suitable kind such as a soldered or brazed joint.

Base 5 is threaded at 14 to engage an internally threaded flange 15 projecting from an intermediate housing member 16 that is also threaded at part 17 to receive upper housing ring 18. Intermediate housing member 16 is provided with a shoulder 19 adapted to be brought against diaphragm 12 in clamping-like relation which tends to prevent flexing movement of the diaphragm to travel beyond this shoulder toward the sealed periphery 13. A surge plate 20 extends transversely from housing ring 18 and confines a diaphragm loading means between it and diaphragm 12. The diaphragm loading means is preferably in the form of a belleville spring disk 21 which may be gradually deflected upwardly by the pressure until it engages surge plate 20. Surge plate 20 is provided with a conical underface to receive disk 21 and prevent further upward movement thereof. The outer periphery of disk 21 normally bears against the underside of surge plate 20 and is held against any transverse shifting by a shoulder 22 forming the inside corner of upper part 17 of intermediate housing 16.

Intermediate the diaphragm 12 and disk 21 is a flexible connection designated broadly as 24. In the specific embodiments of the invention disclosed herein, this connection 24 comprises a series of concentric pressure transmitting rings 25, 26 and 27. Each ring is shown as a separate element with its base 28 of a curvature preferably corresponding to the curvature of the diaphragm surface on which it seats and with its side walls 29 sloping away from the side walls of the adjacent rings. In other words, center ring 26 may have both of its side walls sloping away from the walls of the other rings 25 and 27, while inner ring 25 need have only its outer side wall sloping and the outermost ring 27 have its inner side wall sloping. The outside wall of ring 27 may be flat against the inside face of part 17. The top sides of these rings 25, 26 and 27 are somewhat pointed as indicated at 30, 31 and 32, respectively, which may be blunt if so desired, and which engage the underside of the spring disk 21. This construction thus provides the rings 25, 26 and 27 with a smaller cross section at their upper ends than at their bases so that they will be spaced from each other at their upper ends to prevent any binding of the rings during flexing of connection 24. It will be apparent that although the specific construction of rings 25, 26 and 27 affords a unique arrangement accomplishing the purpose desired, other forms of construction might obviously be designed to accomplish the same purpose, and, to this extent, it is intended that these other forms are to be considered within the scope of the present invention.

As to point 30 of inner ring 25 engaging spring disk 21, it is quite apparent that this unique design permits the ready replacement of a like ring for ring 25 which will have its equivalent point 30 engaging spring disk 21 at a different distance with respect to the latter's outer periphery. Thus the range of the operating pressure may be readily changed. If a higher operating pressure is desired for spring disk 21, this point 30 of inner ring 25 may be moved toward the outer periphery of spring disk 21. If a lower operating pressure is desired for spring disk 21, this point 30 of inner ring 25 may be moved toward the inner periphery of spring disk 21.

I have illustrated such an arrangement in Figs. 3 to 5, inclusive. Ring 25 shown in Fig. 3 is slightly enlarged over that shown in Fig. 1 and its point 30 is located for the purposes of illustration at about the same location as in Fig. 1. However, in Fig. 4 this point 30 has been moved to the left or to the outer face of the ring itself, which is another way of stating that point 30 has been so moved as to shorten the distance between it and the outer periphery of spring disk 21 to increase the pressure range at which spring disk 21 will be influenced to operate. Again, in Fig. 5, this point 30 is still farther toward the outer face of ring 25 and the distance between it and the outer periphery of spring disk 21 has been correspondingly shortened to increase further the operating pressure range.

When spring disk 21 moves to switch operating position, rings 25, 26 and 27 maintain their same relative position of engagement with diaphragm 12 and spring disk 21. It will be observed that rings 25, 26 and 27 will engage spring disk 21 at a fixed radius through the flexing motion of both the spring disk and the diaphragm. This fixed radius is maintained on the forward movement as well as on the return movement. Although there may be a slight differential between the pressures operating the spring disk and the diaphragm on their forward and return movements, this differential is maintained constant due to the inability of the rings to shift. The rings cannot shift at their bases. With the spacing 35 between the rings at their tops, the rings will not tend to bind when moved axially as the diaphragm and spring disk are flexed against the surge plate, but their points of engagement 30, 31 and 32 will not shift.

The arrangement prevents destructive stressing of the diaphragm 12 and permits the use of a Belleville spring in connection with a sealed diaphragm without imparting destructive stresses at the seal or elsewhere in the diaphragm. The change of pressure range may be accurately determined and may be made to cover a wide field of use, this depending upon the relative sizes and design of rings so as to locate point 30 as desired.

Fig. 6 illustrates the pressure actuated device embodying the invention as applied to a pressure actuated switch. The spring disk 21 and the surge plate 20 are provided with center openings to permit a pin 36 to extend therethrough and ring 25 to diaphragm 12. When diaphragm 12 is flexed upwardly and the spring disk 21 is swung beyond center to engage against surge plate 20, pin 36 flexes finger 37 to tilt its member 38 and allow spring contact 39 to swing downwardly into engagement with adjustable contact 40. Quite obviously, movement of spring contact 39 can be made to move contact 40 to open circuit position instead of closed circuit position as is well understood in the art.

Figure 8:
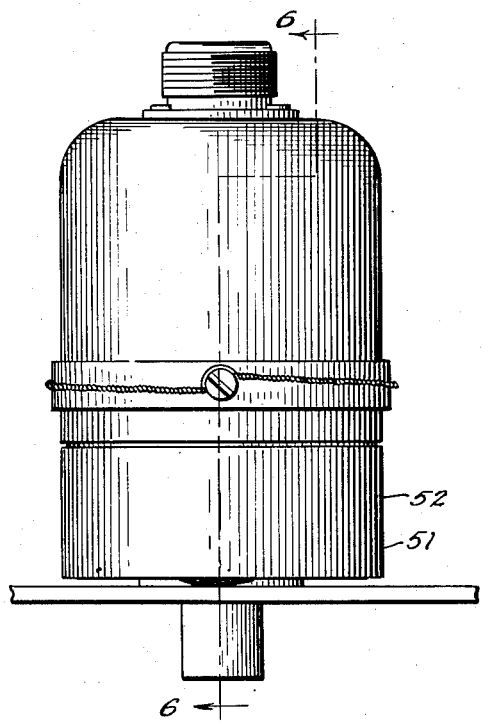
Fig. 8 is an elevational view of the same.

In Figs. 7 and 8, a modified embodiment is illustrated. Diaphragm 45 is mounted upon base member 46 which is preferably formed with a diaphragm receiving surface 47 also provided with a number of small cross grooves 48 to permit the fluid to act over a greater area against the underside of diaphragm 45 than that provided by central passage 49.

Base 46 is threaded at 50 to engage internally threaded flange 51 of housing member 52 having a shoulder 53 bearing against diaphragm 45 in clamping-like relation when base 46 and housing member 52 are in assembled relation so as to prevent flexing movement of diaphragm 45 from travelling beyond shoulder 53. A similar diaphragm loading member in the form of a Belleville spring 54 is mounted below a surge plate 55 disposed in a central opening in housing member 52. Surge plate 55 has a conical undersurface to receive Belleville spring 54 and prevent further upward movement thereof. The outer periphery of spring 54 bears against the wall of said central opening in housing member 52 and is thereby held against shifting movement.

Flexible connection 56 in the form of concentric pressure transmitting rings 57, 58 and 59 are disposed between diaphragm 45 and spring 54. It will be observed that in this embodiment rings 57, 58 and 59 do not have their side walls tapered although their upper end has a projection 60 providing a reduced engagement with spring 54 to accomplish substantially the same result accomplished by points 30 of rings 25, 26 and 27. Ring 57 is formed somewhat differently than ring 25 in that it is provided with an upwardly extending portion 61 adapted to engage pin 62 of switch 63. Movement of portion 61 upwardly to lift pin 62 may either open or close the contacts of switch 63, depending upon the arrangement of these contacts. Switch 63 may be constructed similarly to the switch shown in Fig. 6.

In order to incorporate a Belleville spring 54 of smaller or greater cross section and not be required to revise the structure or effect the travel of diaphragm 45 when actuated, a series of disks 65 are inserted over and against surge plate 55. These disks 65 are held in position by a plate 66 threaded into the upper part of the central opening in housing 52. Disks 65 are preferably provided with central openings so that they may be stacked together over and down around central portion 61 of ring plate 57. Mere removal of plate 66 affords access to disks 65 to remove or add one or more of these disks, depending upon the thickness of the Belleville spring 54 desired. This arrangement affords a very simple and economical structure that will permit an adjustment of the working conditions or pressure ranges of the unit through the substitution of a different thickness of Belleville spring without requiring considerable change in the unit itself.

It will be observed from the foregoing description of the specific embodiments disclosed that I have provided an exceedingly efficient structure capable of adaptation over a wide range of operating pressures without sacrificing accuracy of operation for a given operating pressure.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. A pressure device of the class described including a base having a diaphragm receiving surface, a diaphragm, means for clamping said diaphragm to said surface, said means being juxtaposed to the periphery of said surface, said base having a passage therein extending from a source of pressure to the underside of said diaphragm, the pressure flexing said diaphragm in a direction away from said surface, and means tending to restrain the flexing of said diaphragm away from said surface including a spring disk and concentric members disposed between said diaphragm and said spring disk, said members each being seated on said diaphragm with substantially the same surface engaging contour as the surface contour of the diaphragm and having concentric contact with said spring disk.

2. A pressure device of the class described including a base, a diaphragm having a flexible portion operably seated upon said base, a pressure connection leading to the underside of said flexible portion from a source of pressure, the pressure flexing said flexible portion in a direction away from said base, and pressure resisting means tending to restrain said pressure including an over-center spring disk and a flexible connection between said spring disk and said flexible portion, said flexible connection engaging both said spring disk and said diaphragm and having the same surface engaging contour as the surface contour of the diaphragm.

3. A pressure device of the class described including a base, a diaphragm having a flexible portion operably seated upon said base, a pressure connection leading to the underside of said flexible portion from a source of pressure, the pressure flexing said flexible portion in a direction away from said base, and pressure resisting means tending to restrain said pressure including an over-center spring disk and a flexible connection between said spring disk and said flexible portion, said flexible connection having surface engagement with said flexible portion and a multicontact engagement with said spring disk whereby to follow the contour of said spring disk and said flexible portion upon movement by said pressure, said flexible connection having the same surface engaging contour as the surface contour of the flexible portion.

4. A pressure device of the class described comprising a base, a diaphragm having a flexible portion operably seated upon said base, a pressure connection leading to the underside of said flexible portion from a source of pressure, the pressure flexing said flexible portion in a direction away from said base, and pressure resisting means tending to restrain said pressure including an over-center spring member and a plurality of concentric rings forming a flexible connection between said flexible portion and said spring member, said concentric rings having surface engagement at their bases with said flexible portion and being of less width at their top, said concentric rings being formed with a limited engagement with said spring member.

5. A pressure responsive actuator comprising a diaphragm and a base to which said diaphragm is sealed substantially at its outer periphery, a pressure connection leading to the underside of said diaphragm from a source of pressure, the pressure flexing said diaphragm away from said base, an actuator connection at the other side of said diaphragm for movement by said diaphragm when the latter is flexed by the pressure, and pressure resisting means restraining said diaphragm from movement until a predetermined pressure is reached, said means including an over-center spring disk and a flexible connection between said diaphragm and said disk, said connection including a plurality of individual elements engaging both said diaphragm and said disk, the area of engagement with said disk being less than the area of engagement with said diaphragm.

6. A pressure responsive actuator comprising a diaphragm and a base to which said diaphragm is sealed substantially at its outer periphery, a pressure connection leading to the underside of said diaphragm from a source of pressure, the pressure flexing said diaphragm away from said base, an actuator connection at the other side of said diaphragm for movement by said diaphragm when the latter is flexed by the pressure, and pressure resisting means restraining said diaphragm from movement, said means including spring means and a flexible connection between said diaphragm and said spring means, said flexible connection including a plurality of elements engaging both said diaphragm and said spring means, the area of engagement with said spring means being less than the area of engagement with said diaphragm.

7. A pressure responsive actuator comprising a diaphragm and a base to which said diaphragm is sealed substantially at its outer periphery, a pressure connection leading to the underside of said diaphragm from a source of pressure, the pressure flexing said diaphragm away from said base, an actuator connection at the other side of said diaphragm for movement by said diaphragm when the latter is flexed by the pressure, and pressure resisting means restraining said diaphragm from movement, said means including spring means and a flexible connection between said diaphragm and said spring means, said flexible connection including a plurality of elements engaging both said diaphragm and said spring means, said elements having substantially the same surface engaging contour as the surface contour of the diaphragm.

8. A pressure responsive actuator comprising a diaphragm and a base upon which said diaphragm is operably seated, a pressure connection leading to the space between said diaphragm and said base, the pressure flexing said diaphragm in a direction away from said base, an actautor connection at the other side of said diaphragm for movement by said diaphragm when the latter is flexed by the pressure, and pressure resisting means restraining said diaphragm from movement, said means including spring means and a plurality of annular rings between said spring means and said diaphragm, said rings engaging both said diaphragm and said spring means at a fixed radius throughout the motion of said spring means and said diaphragm, said rings having substantially the same surface engaging contour as the surface contour of the diaphragm.

9. A pressure responsive actuator comprising a diaphragm and a mounting therefor, said diaphragm having a flexible portion operably seated upon said mounting, means at one side of said diaphragm for flexing the same in the opposite direction, an actuator connection at the other side of said diaphragm for movement by said diaphragm when the latter is flexed, and pressure resisting means restraining said diaphragm from movement, said pressure resisting means comprising a spring disk and a plurality of rings disposed between and engaging both said diaphragm and said spring disk, said rings adjacent said spring disk being of smaller cross section than their portions adjacent said diaphragm to flex axially and maintain substantially a fixed radius with said spring disk during its movement.

10. A pressure responsive actuator comprising a diaphragm and a mounting therefor, said diaphragm having a flexible portion operably seated upon said mounting, means at one side of said diaphragm for flexing the same in the opposite direction, an actuator connection at the other side of said diaphragm for movement by said diaphragm when the latter is flexed, and pressure resisting means restraining said diaphragm from movement, said pressure resisting means comprising a spring disk and a plurality of rings disposed between and engaging both said diaphragm and said spring disk, said rings having surface engagement with said diaphragm and substantially line contact with said spring disk.

11. A pressure responsive actuator comprising a diaphragm and a mounting therefor, said diaphragm having a flexible portion operably seated upon said mounting, pressure means at one side of said diaphragm for flexing the same in the opposite direction, an actuator connection at the other side of said diaphragm for movement by said diaphragm when the latter is flexed, and pressure resisting means restraining said diaphragm from movement, said pressure resisting means comprising a spring disk and a plurality of annular members disposed between and engaging both said diaphragm and said spring disk, said members engaging said spring disk at different radii, at least the innermost member being replaceable to change its location of engagement with said spring disk.

12. A pressure responsive actuator comprising a diaphragm and a mounting therefor, said diaphragm having a flexible portion operably seated upon said mounting, pressure means at one side of said diaphragm for flexing the same in the opposite direction, an actuator connection at the other side of said diaphragm for movement by said diaphragm when the latter is flexed, and pressure resisting means restraining said diaphragm for movement, said pressure resisting means comprising a spring disk and an intermediate connection disposed between and engaging said diaphragm and said spring disk, said intermediate connection having replaceable provisions for changing the location of engagement of said intermediate connection with said spring disk with respect to the center of said spring disk to vary the pressure at which said pressure means will flex said diaphragm and effect operation of said spring disk.

13. A pressure device of the class described including a base, a diaphragm carried by and operably seated upon said base, a source of pressure extending to one side of said diaphragm, the pressure flexing said diaphragm in a direction opposite to said side and pressure resisting means tending to restrain said pressure including a spring disk and a connection between said spring disk and said diaphragm, said connection comprising a series of independently movable concentric rings.

14. A pressure device of the class described including a base, a diaphragm carried by and operably seated upon said base, a source of pressure extending to one side of said diaphragm to flex said diaphragm in the opposite direction, pressure resisting means tending to restrain said pressure including a spring disk and a connection between said spring disk and said diaphragm, said connection comprising a series of independently movable concentric rings, a surge plate for said spring disk, and adjustable means for holding said surge plate in operative position with respect to said spring disk.

15. A pressure device of the class described including a base, a diaphragm carried by and operably seated upon said base, a source of pressure extending to one side of said diaphragm to flex said diaphragm in the opposite direction, pressure resisting means tending to restrain said pressure including a spring disk and a connection between said spring disk and said diaphragm, said connection comprising a series of independently movable concentric rings, a surge plate for said spring disk, and adjustable means for holding said surge plate in operative position with respect to said spring disk, said adjustable means including a plurality of separately removable spacing elements adapted to compensate for the thickness of said spring disk.

References Cited in the file of this patent

UNITED STATES PATENTS

| | | |
|---|---|---|
| 9,107 | Ware | July 6, 1852 |
| 1,288,389 | Deegan | Dec. 17, 1918 |
| 1,536,035 | Twardowsky | Apr. 28, 1925 |
| 1,819,947 | De Lavaud | Aug. 18, 1931 |
| 2,212,246 | Pierce | Aug. 20, 1940 |
| 2,220,902 | Hastings | Nov. 12, 1940 |
| 2,433,221 | Huber | Dec. 23, 1947 |
| 2,500,457 | Hess | Mar. 14, 1950 |
| 2,503,594 | Phelps | Apr. 11, 1950 |

FOREIGN PATENTS

| | | |
|---|---|---|
| 139,350 | Austria | Nov. 10, 1934 |
| 201,375 | Switzerland | Feb. 16, 1939 |
| 570,407 | Germany | of 1933 |